C. F. LINDEROTH.
SELF PROPELLED WHEEL.
APPLICATION FILED APR. 18, 1913.
1,101,201.
Patented June 23, 1914.
3 SHEETS—SHEET 3.
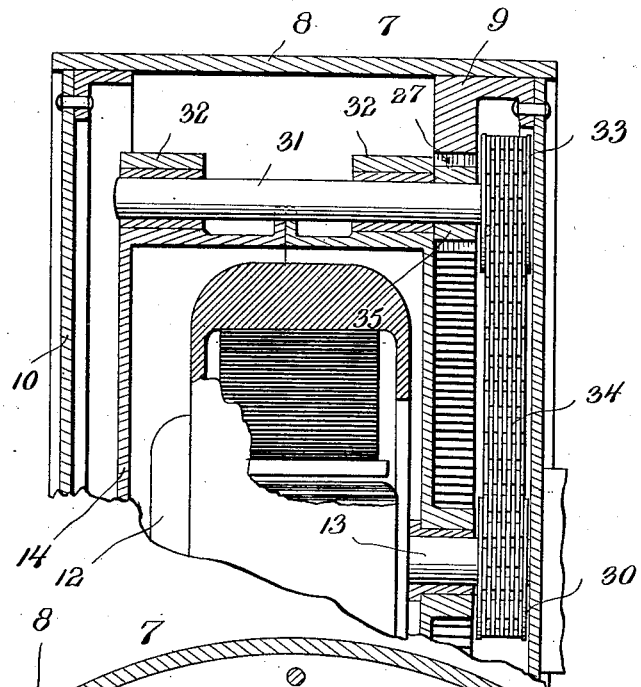
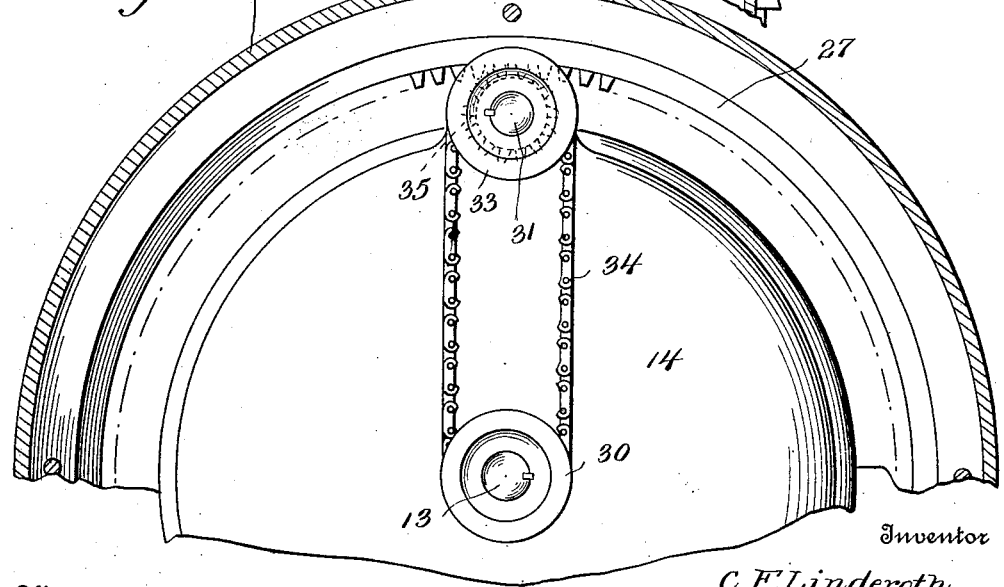
Witnesses
William Smith
John J. McCarthy
Inventor
C. F. Linderoth.
By Victor J. Evans
Attorney
COLUMBIA PLANOGRAPH CO., WASHINGTON, D. C.

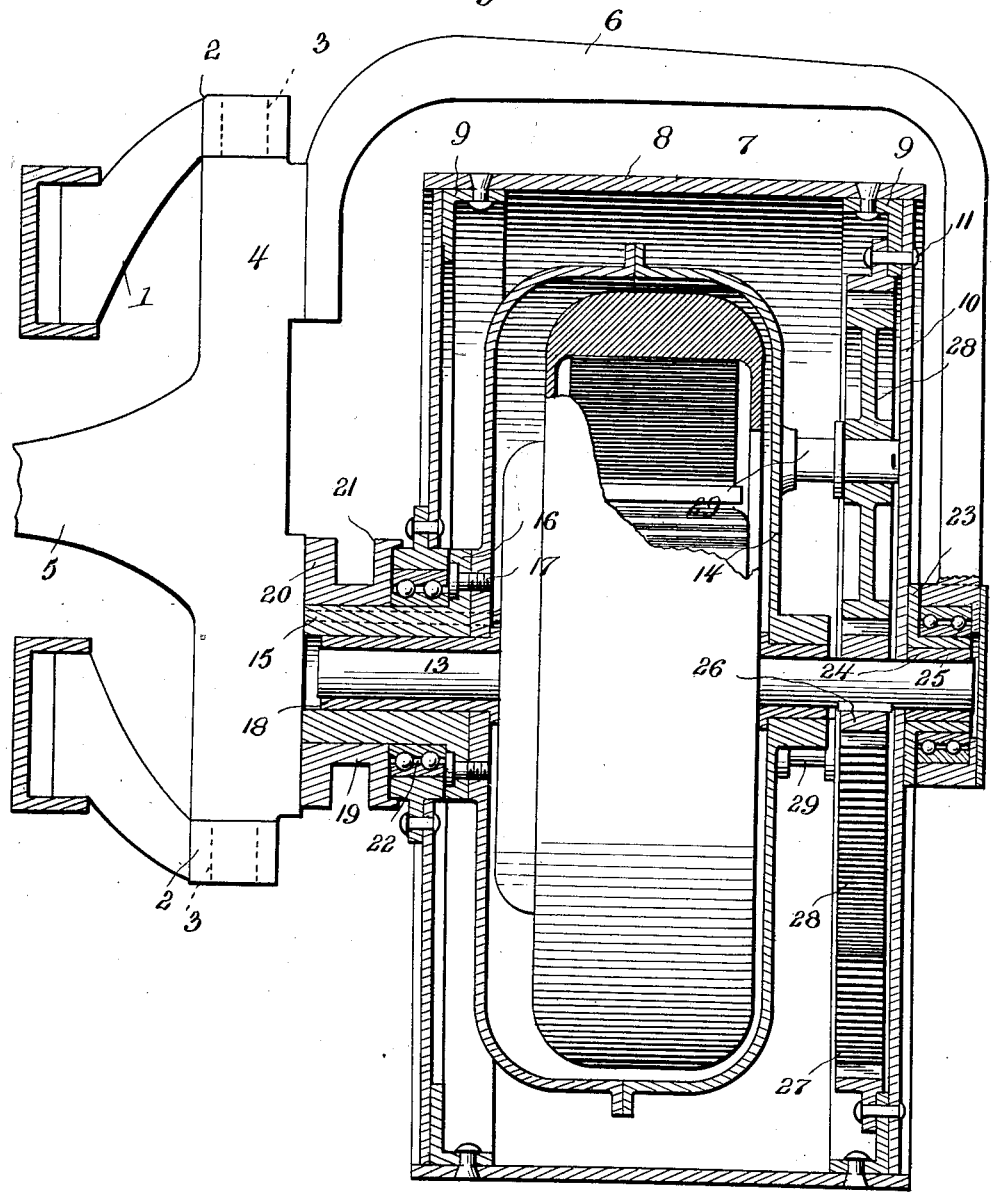

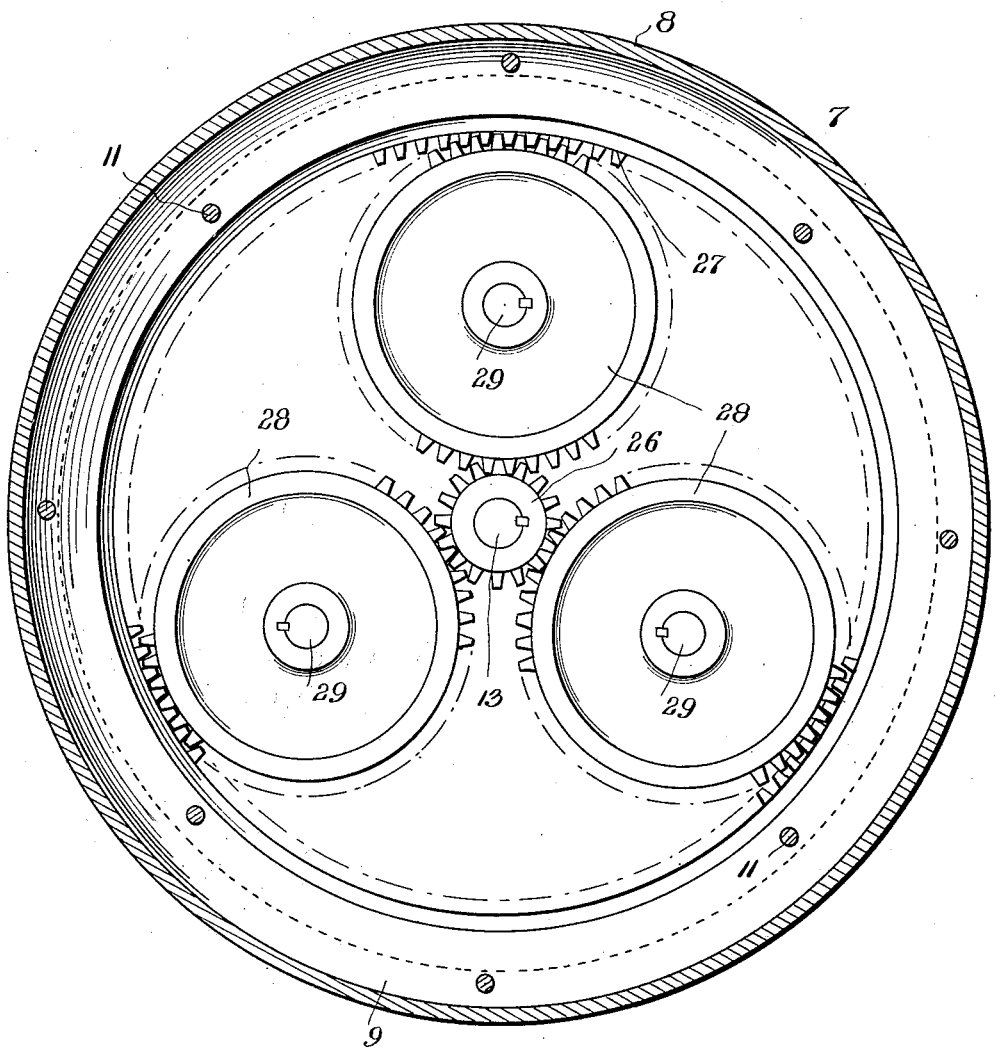

UNITED STATES PATENT OFFICE.

CARL F. LINDEROTH, OF SAN BERNARDINO, CALIFORNIA, ASSIGNOR TO ROTARY TRACTOR COMPANY, INC., OF SAN BERNARDINO, CALIFORNIA, A CORPORATION OF CALIFORNIA.

SELF-PROPELLED WHEEL.

1,101,201.  Specification of Letters Patent.  Patented June 23, 1914.

Application filed April 18, 1913. Serial No. 761,992.

*To all whom it may concern:*

Be it known that I, CARL F. LINDEROTH, a citizen of the United States, residing at San Bernardino, in the county of San Bernardino and State of California, have invented new and useful Improvements in Self-Propelled Wheels, of which the following is a specification.

This invention relates to improvements in self-propelled wheels and has particular application to an electric motor driven wheel.

In carrying out the present invention, it is my purpose to provide a self-propelled wheel which will in itself constitute a power unit and whereby when the wheel is applied to a vehicle such wheel may be employed for traction and steering purposes.

It is also my purpose to provide a self-contained power wheel which will embody in its construction among other features a hollow wheel structure and an electrically propelled motor incased in such wheel structure and fixed therein against movement, driving connections being established between the armature shaft of the motor and the wheel so that in the operation of the motor power will be transmitted to the wheel structure to propel the latter.

Furthermore, I aim to provide a self-propelled wheel which will embrace the desired features of simplicity, efficiency, and durability and which may be manufactured, installed and maintained at a minimum expense.

With the above and other objects in view, the invention consists in the construction, combination and arrangement of parts hereinafter set forth in and falling within the scope of the claim.

In the accompanying drawings; Figure 1 is a vertical sectional view through a wheel constructed in accordance with the present invention, the wheel support being shown partly in elevation. Fig. 2 is a vertical sectional view through the wheel taken at right angles to Fig. 1. Fig. 3 is a vertical sectional view through a modified form of self-propelled wheel, and Fig. 4 is a vertical sectional view taken through the modified form of wheel at right angles to Fig. 3.

In the present instance, I have shown my improved self-propelled wheel as employed for traction purposes. I wish it to be understood, however, that my invention in its useful application is not limited to this particular purpose, as the same may be employed as a belt pulley or other form of driver or prime mover.

Referring now to the accompanying drawings in detail, the numeral 1 designates a bracket designed to be fastened in some suitable manner to the chassis of the motor vehicle and formed with vertically alining bearings 2, 2 designed to receive the trunnions 3 of a vertical stud 4, the latter being equipped with a steering lever 5 whereby the stud may be rotated within its bearings.

The numeral 6 designates an inverted U-shaped support or fork having one limb thereof suitably fastened to or formed integral with the stud 4 and designed to swing with such stud in the movement of the latter under the action of the steering lever 5.

Disposed within the support 6 is a hollow wheel structure 7 composed, in the present instance, of an annular rim or tire 8 having the annular flanges 9 of angle iron riveted or otherwise connected thereto adjacent to the opposite edges and on the inner surface thereof, and side plates 10, 10 each bolted or otherwise suitably connected to the inwardly extending flange of the respective angle iron adjacent to the marginal edge thereof, as at 11. Arranged within the hollow wheel structure 7 is an electric motor 12 of any desired construction having the armature shaft 13 thereof extending outwardly of the side plates 10, 10 of the wheel, while inclosing the motor 12 within the wheel structure is a casing or housing 14. This casing or housing and the motor 12 carried thereby are designed to be held within the wheel structure against rotation and for this purpose a connection is established between one side of the housing and the adjacent limb of the support 6. In the present instance, this connection comprises an annulus 15 passed through an opening formed centrally in the side plate 10 and provided at its inner end with a circumferentially extending flange 16 bolted as at 17 or otherwise suitably connected with the adjacent wall of the casing 14 and surrounding the respective end of the armature shaft 13, a bushing or the like 18 being interposed between the inner wall of the annulus 15 and the respective end of the armature shaft.

Surrounding the outer end portion of the annulus 15 is a collar 19 formed at its outer extremity with an outwardly projecting circumferential flange 20 designed to be connected to the respective limb of the support 6 and provided at its inner end with an outwardly extending annular flange 21 spaced apart from the flange 16 secured to the housing 14 within the wheel structure to form a way for an anti-friction bearing 22 suitably fastened to the plate 10 and disposed within the opening therein, thereby forming a bearing for the inner side of the hollow wheel structure. The opposite side plate 10 of the wheel structure is formed with a central opening coaxial with the opening in the other plate and bolted or otherwise suitably fastened to the outer side plate of the wheel structure and surrounding the opening therein is an angle iron annulus 23 surrounding the adjacent end of the armature shaft 13 and separated therefrom by means of a bushing 24. The adjacent limb of the support 6 carries an anti-friction bearing 25 receiving the outwardly extending flange of the angle iron annulus 23 thereby enabling the end of the armature shaft 13 within such annulus to form a bearing within the opposite side of the wheel.

In the present instance, the driving connections between the motor and the wheel structure 7 comprise a pinion 26 keyed upon the armature shaft 13 between the respective side of the housing 14 and the outer bearing 25, and an internal gear 27 suitably fastened to and carried by the inwardly extending flange of the angle iron 9 at the outer side of the wheel, gear wheels 28 meshing with said internal gear 27 and pinion 26 whereby in the rotation of the armature shaft motion will be imparted to the wheel structure. In this instance, the gear wheels 28 are rotatable about studs 29 carried by the adjacent side of the motor housing 14. It is conceivable, however, that these gear wheels 28 may be journaled upon suitable stub shafts carried by the adjacent side plate 10 of the wheel.

In the modified form of the invention illustrated in Figs. 3 and 4, I substitute for the gear connections, between the armature shaft of the motor and the wheel structure, shown in Figs. 1 and 2, a chain drive composed of a sprocket wheel 30 keyed upon the armature shaft 13 in place of the gear pinion 26, and a shaft 31 journaled in suitable alining bearings 32, 32 carried by the periphery of the housing 14, a sprocket wheel 33 being keyed upon one extremity of the shaft 31, an endless chain 34 being trained over the sprocket wheels 30 and 33 so that in the rotation of the sprocket wheel 30 under the action of the motor, a rotary movement will be imparted to the shaft 31. Keyed upon this shaft 31 is a gear pinion 35 meshing with the internal gear 27 carried by the rim of the wheel structure. Thus, as the motor is placed in operation and is held stationary incident to the connection between the same and the wheel support, it will be seen that the wheel structure will be propelled.

From the foregoing description taken in connection with the accompanying drawings, the construction, mode of operation and manner of employing my invention will be readily apparent.

It will be seen that I have provided a self-propelled wheel wherein the driving motor is held stationary while the wheel structure inclosing such driving motor will rotate thereabout in the operation of the motor. Furthermore, it will be observed that the connection between the motor housing and the wheel support whereby the motor housing is held stationary forms a bearing for one side of the wheel, while the opposite extremity of the armature shaft of the motor constitutes a bearing for the opposite side of the wheel.

In the practice of my invention, the motor may be supplied with current in any suitable manner and from any appropriate source.

While I have herein shown and described certain preferred forms of my invention by way of illustration, I wish it to be understood that I do not limit or confine myself to the precise details of construction herein described and delineated, as modification and variation may be made within the scope of the claim without departing from the spirit of the invention.

I claim:

In a self-propelled wheel, a hollow wheel structure, a support for said wheel, a motor within the wheel structure and having the armature shaft thereof extending outwardly through the opposite sides of the wheel structure, a casing inclosing said motor, a rigid connection between said casing and support, said connection comprising an annulus surrounding the adjacent end of the armature shaft, a circumferential flange formed on the inner end of said annulus, a connection between said flange and the adjacent side of the motor casing, a collar surrounding said annulus at the outer side of the wheel structure and a circumferential flange formed on said collar and spaced apart from the first-mentioned flange to form a race-way, and driving connections between the other end of the armature shaft and said wheel structure.

In testimony whereof I affix my signature in presence of two witnesses.

CARL F. LINDEROTH.

Witnesses:
FRED H. NETT,
M. NETT.

Copies of this patent may be obtained for five cents each, by addressing the "Commissioner of Patents, Washington, D. C."